United States Patent
Fogtmann et al.

(10) Patent No.: US 10,238,961 B2
(45) Date of Patent: Mar. 26, 2019

(54) TOY SYSTEM COMPRISING TOY ELEMENTS THAT ARE DETECTABLE BY A COMPUTING DEVICE

(71) Applicant: LEGO A/S, Billund (DK)

(72) Inventors: Maiken Hillerup Fogtmann, Vejle (DK); Daniel W. Mathiasen, Hedensted (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 15/548,333

(22) PCT Filed: Feb. 2, 2016

(86) PCT No.: PCT/EP2016/052164
§ 371 (c)(1),
(2) Date: Aug. 2, 2017

(87) PCT Pub. No.: WO2016/124584
PCT Pub. Date: Aug. 11, 2016

(65) Prior Publication Data
US 2018/0021673 A1    Jan. 25, 2018

(30) Foreign Application Priority Data

Feb. 4, 2015  (DK) .................................. 2015 70065

(51) Int. Cl.
*A63F 13/2145* (2014.01)
*G06F 3/0488* (2013.01)
(Continued)

(52) U.S. Cl.
CPC ...... *A63F 13/2145* (2014.09); *A63F 3/00643* (2013.01); *A63F 13/24* (2014.09);
(Continued)

(58) Field of Classification Search
CPC ...... A63F 13/2145; A63F 13/24; A63F 13/58; A63F 3/00643; A63F 2009/241;
(Continued)

(56) References Cited

U.S. PATENT DOCUMENTS

| | | | |
|---|---|---|---|
| 7,905,759 B1 * | 3/2011 | Ghaly | A63H 13/00 446/175 |
| 8,358,286 B2 | 1/2013 | Cannon | |

(Continued)

FOREIGN PATENT DOCUMENTS

| | | |
|---|---|---|
| EP | 2 405 330 A2 | 1/2012 |
| FR | 2 995 423 A1 | 3/2014 |

(Continued)

OTHER PUBLICATIONS

OPTO's Examination Report issued in Danish priority application No. PA 2015 70065, dated Sep. 18, 2015.

(Continued)

*Primary Examiner* — Werner G Garner
(74) *Attorney, Agent, or Firm* — Day Pitney LLP

(57) ABSTRACT

A toy system comprising one or more toy elements configured to be detectable by a touch screen when brought within a proximity of the touch screen; and a computing device configured to: detect said one or more toy elements within a proximity of the touch screen; detect, in addition to detecting said one or more toy elements, one or more further touch events on the touch screen in a first predetermined spatial relationship to the detected one or more toy elements; and responsive to the detection of said one or more further touch events on the touch screen in said first predetermined spatial relationship to the detected one or more toy elements, to cause a user-perceptible output.

8 Claims, 7 Drawing Sheets

(51) Int. Cl.
*A63F 13/58* (2014.01)
*A63F 13/24* (2014.01)
*A63F 3/00* (2006.01)
*A63F 9/24* (2006.01)

(52) U.S. Cl.
CPC ............ *A63F 13/58* (2014.09); *G06F 3/0488* (2013.01); *A63F 2009/241* (2013.01); *A63F 2300/1075* (2013.01); *G06F 2203/04808* (2013.01)

(58) Field of Classification Search
CPC ........... A63F 2300/1075; G06F 3/0488; G06F 2203/04808
See application file for complete search history.

(56) References Cited

U.S. PATENT DOCUMENTS

| | | |
|---|---|---|
| 2008/0161086 A1 | 7/2008 | Decre et al. |
| 2009/0322352 A1 | 12/2009 | Zachut et al. |
| 2012/0050198 A1 | 3/2012 | Cannon |
| 2012/0062490 A1 | 3/2012 | Heatherly et al. |
| 2013/0012313 A1 | 1/2013 | Chen |
| 2013/0217295 A1 | 8/2013 | Karunaratne |
| 2014/0033583 A1 | 2/2014 | Larson et al. |

FOREIGN PATENT DOCUMENTS

| | | |
|---|---|---|
| GB | 2 516 345 A | 1/2015 |
| JP | 2001 265523 A | 9/2001 |
| KR | 2013 0113577 A | 10/2013 |
| WO | 2012 162090 A2 | 11/2012 |
| WO | 2012 162090 A3 | 11/2012 |

OTHER PUBLICATIONS

International Preliminary Report on Patentability issued in corresponding international application No. PCT/EP2016/052164, dated Feb. 1, 2017.
International Search Report issued in corresponding international application No. PCT/EP2016/052164, dated Aug. 11, 2016.
Written Opinion issued in corresponding international application No. PCT/EP2016/052164, dated Aug. 11, 2016.

* cited by examiner

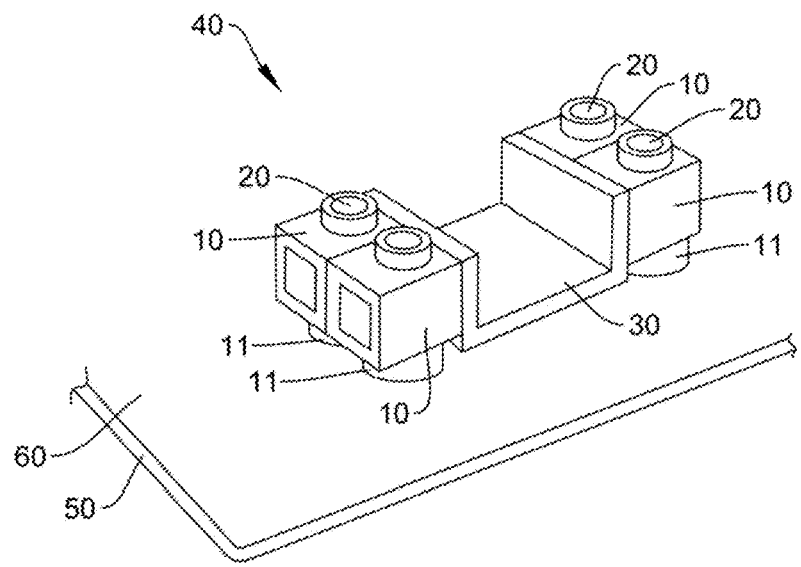
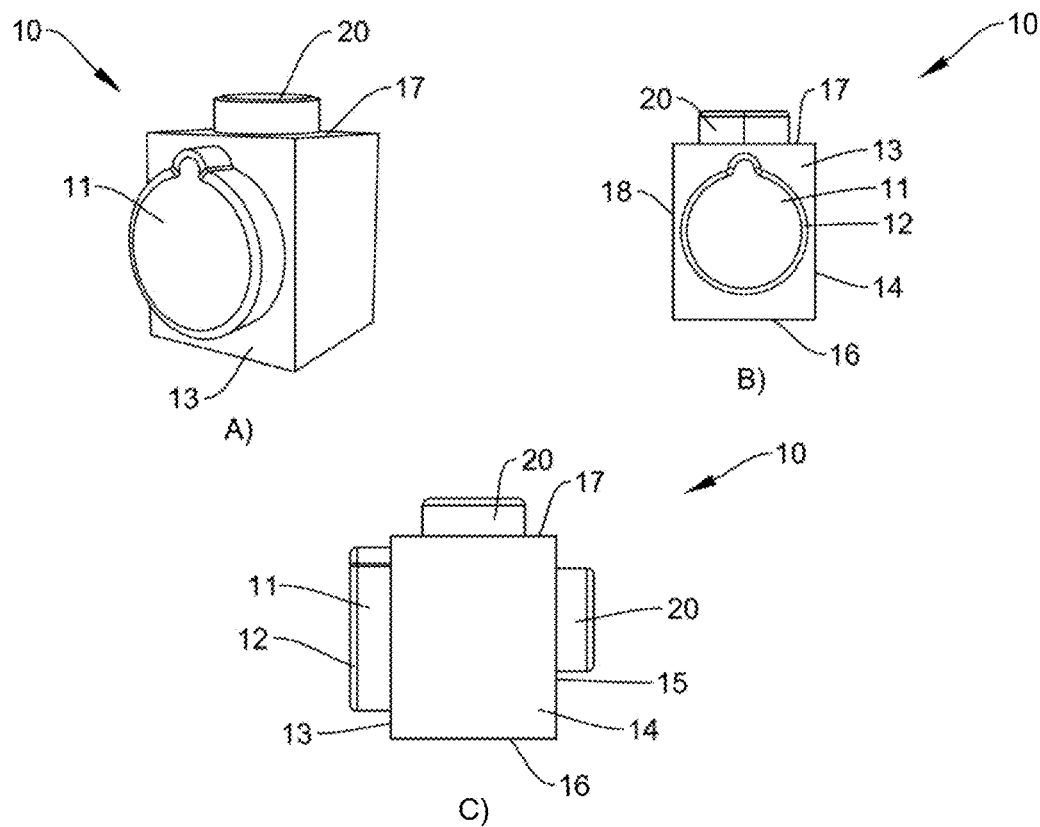
FIG. 1
FIG. 2

A)

B)

TOY SYSTEM COMPRISING TOY ELEMENTS THAT ARE DETECTABLE BY A COMPUTING DEVICE

CROSS-REFERENCE TO RELATED APPLICATIONS

This application is a U.S. National Stage of International Application No. PCT/EP2016/052164, filed on 2 Feb. 2016 and published on 11 Aug. 2016, as WO 2016/124584 A2, which claims the benefit of priority to Danish Patent Application No. PA 2015 70065, filed on 4 Feb. 2015. The content of each of the above referenced patent applications is incorporated herein by reference in its entirety for any purpose whatsoever.

The present invention relates to a toy system comprising toy elements that are detectable by a touch screen when brought within a proximity of the touch screen; and a computing device configured to detect the toy elements within a proximity of the touch screen.

BACKGROUND OF THE INVENTION

Various computing devices that include a touch screen configured to detect an object, such as a stylus or a user's finger, are known and there are a relatively large number of publications that describe objects having one or more touch points that may be used as interface to a computing device having a touch screen and, in particular, in connection with toys or game play.

The patent application US 2013/0012313 A1 discloses a game piece apparatus having a plurality of conductive points for interacting with a touch screen computing device. The game piece may comprise an input component that can receive signals from the touch screen device and generate an effect based on the signals. The game piece may include momentary touch points allowing for variable game play, and also have different touch point patterns allowing the touch screen computing device to generate effects or responses based on the touch point pattern of the game piece.

The U.S. Pat. No. 8,358,286 discloses a computing device and input and output of data from the computing device. The patent also discloses an object that is identifiable by the computing device having a touch screen. The object includes contact members that can engage or be positioned proximate to the touch screen. The contact members create contact points that are sensed or detected by the touch screen. The object is at least partly conductive and includes at least a first contact member and a second contact member spaced from the first contact member. The first and second contact members define the pattern of contact points. An output is generated and displayed by the touch screen when the object engages or is proximate to the touch screen and is identified.

However, it remains desirable to further improve the play value of such toy systems.

BRIEF DESCRIPTION OF THE INVENTION

According to a first aspect, disclosed herein are embodiments of a toy system comprising one or more toy elements configured to be detectable by a touch screen when brought within a proximity of the touch screen; and a computing device configured to:
detect said one or more toy elements within a proximity of the touch screen;
detect, in addition to detecting said one or more toy elements, one or more further touch events on the touch screen in a first predetermined spatial relationship to the detected one or more toy elements; and
responsive to the detection of said one or more further touch events on the touch screen in said first predetermined spatial relationship to the detected one or more toy elements, to cause a user-perceptible output.

Hence, the computing device selectively detects further touch events that occur in a predetermined spatial relationship of the detected toy element, i.e. a part of the touch screen may be regarded as a virtual user input interface associated with the detected toy element, such that the location of the virtual input interface within the touch screen area depends on the position of the detected toy element within the touch screen area. When the user moves the toy element about the touch screen the position(s) of the virtual input element(s) move along with the toy element. A further touch event may be a touch event caused by a user's finger or by another device, e.g. a user-controlled device, such as a stylus or another toy element. A touch event comprises the detection of a detectable object within a proximity of the touch screen.

The first predetermined spatial relationship may be defined as one or more positions relative to a position and/or orientation of the detected toy element, e.g. at a predetermined distance and/or in a predetermined direction from the detected toy element. It will be appreciated that the computing device may be configured to detect touch events at more than one predetermined positions and/or orientations relative to the detected toy element. In some embodiments, the first spatial relationship comprises a position outside of a periphery of a projection of the one or more toy elements onto the touch screen, such as within a predetermined proximity of the projection and/or at a predetermined position relative to the projection.

The user-perceptible output may comprise a visible output such as an output displayed on the touch screen. Alternatively or additionally, the user-perceptible output may comprise an audible output, e.g. a sound effect, music, speech output by the computing device. In some embodiments, the user-perceptible output comprises a visible output on the touch screen in a second predetermined spatial relationship with the detected one or more toy elements, i.e. the generated output may appear at one or more positions within the touch screen area which one or more positions depend on the position and/or orientation within the touch screen area of the detected toy element. It will be appreciated that the second spatial relationship may depend on further parameters, e.g. the type of input received, a game state, the type of toy element, which of a number of alternative touch events have been detected, and/or the like. In some embodiments, the second spatial relationship is different from the first spatial relationship. The second spatial relationship may comprise a position outside a periphery of a projection of the one or more toy elements onto the touch screen, such as within a predetermined proximity of the projection and/or at a predetermined position relative to the projection.

In some embodiments, the computing device is further configured to display, responsive to the detection of said one or more toy elements within a proximity of the touch screen; a visible indication of said first spatial relationship. Displaying a visible indication may include displaying a user-interface element indicating the area within the touch screen to be touched so as to be detected as a further touch event in a first predetermined spatial relationship to the detected one or more toy elements. For example, the area to be touch may be displayed in a predetermined color and/or pattern, and/or be surrounded by a boundary, and/or indicated in another suitable manner. The area within the touch screen to be touched so as to be detected as a further touch event in a first predetermined spatial relationship may have various sizes or shapes. The size may depend on the accuracy with which the touch screen is capable of detecting the location of a touch event by e.g. a finger, stylus or the like, so as to allow the computing device to sufficiently reliably distinguish between a touch event within the first predetermined spatial relationship with the toy element and other, unrelated touch events.

Displaying the visible indication and/or causing the user-perceptible output may be further conditioned on additional events, e.g. on a predetermined position, orientation, and/or movement of the detected one or more toy elements, on a game event, etc.

According to a second aspect, disclosed herein are embodiments of a toy system comprising one or more toy elements, the toy elements comprising a number of touch points configured to be detectable by a touch screen when brought within a proximity of the touch screen and defining a touch pattern; and a computing device configured to:
  detect said touch pattern of touch points when said one or more toy elements are within a proximity of the touch screen;
  associate a virtual character of a computer game with the detected touch pattern, said virtual character having two or more progression levels within the computer game; wherein the touch pattern is indicative of one of the progression levels and wherein the computing device is further configured to associate one of the progression levels to the virtual character responsive to the detection of the touch pattern.

Hence, the touch pattern not only determines the identity of the virtual character but also a progression level of the virtual character.

In some embodiments, the one or more toy elements each comprise connectors for connecting the toy element with other toy elements so as to form a modular toy structure; wherein two or more toy elements, when interconnected to form the modular toy structure, together define said touch pattern.

The toy elements may define a touch pattern in a variety of ways. In some embodiments, at least some toy elements comprise one or more touch points that are detectable by the touch screen. When the toy elements are interconnected with each other the touch points of two or more of the toy elements thus form a touch pattern of touch points. In other embodiments, the toy elements are configured to be held by a user such that when the user holds the toy element, or a spatial structure formed by one or more toy elements, and brings the toy element or spatial structure into a proximity of the touch screen, the fingers of the user holding the toy element form a predetermined pattern of touch points. For example, the toy elements may comprise templates or orifices at predetermined positions configured to accommodate or being engaged by a user's finger or fingertip.

Hence the user may build different modular toy structures, each representing a specific progression level of a specific virtual character, thus allowing a versatile virtual game play.

In some embodiments, the computing device is configured to:
  present a representation of a virtual character having a first progression level responsive to detecting a first touch pattern;
  responsive to a game event presenting to the user instructions to build a modular toy structure, the modular toy structure comprising two or more toy elements interconnected with each other so as to define a second touch pattern, different from the first touch pattern; and
  responsive to detecting the second touch pattern, present a representation of a virtual character having a second progression level.

Hence, when a new progression level of a virtual character is unlocked, the computing device may provide the user with building instructions instructing the user to build a corresponding modular toy structure which defines a touch pattern that is subsequently recognizable by the computing device as being associated to the newly unlocked progression level. The building instructions may be provided in a number of ways, e.g. as a sequence of pictures illustrating different stages of the construction progress, as an animation or movie illustrating the construction progress, or in any other suitable way.

According to a third aspect, disclosed herein are embodiments of a toy system comprising one or more toy elements configured to be detectable by a touch screen when brought within a proximity of the touch screen; and a computing device configured to detect said one or more toy elements within a proximity of the touch screen;
  wherein the toy system comprises a first toy element, a releasable toy element releasably connectable to a structure comprising at least the first toy element, and a release mechanism configured to causes release of the releasable toy element from said structure, wherein the releasable toy element is configured to be individually detectable by a touch screen when brought within a proximity of the touch screen; and where the computing device is configured to detect the releasable toy element when the releasable toy element is released from said structure and is within a proximity of the touch screen.

In some embodiments, the first toy element comprises the release mechanism. The structure may be a modular structure constructed from interconnectable toy elements as described herein.

In some embodiments, the release mechanism comprises a user-activatable trigger configured to activate the release mechanism. In some embodiments, the user-activatable trigger and/or release of the release mechanism may be detectable by the computing device. For example, the first toy element or the structure comprising the first toy element may comprising a number of touch points configured to be detectable by a touch screen when brought within a proximity of the touch screen and defining a touch pattern; and the user-activatable trigger and/or the release mechanism may be configured to alter the touch pattern when the user-activatable trigger is activated and/or when the release mechanism releases the releasable toy element. The alteration of the touch pattern may be performed in a number of ways. For example, the user-activatable trigger and/or the release mechanism may cause a touch point to be moved towards or away from the touch screen, thus adding a further touch point to the touch pattern or removing a touch point from the touch pattern. Alternatively or additionally, the user-activatable trigger and/or the release mechanism may cause a touch point to be otherwise moved relative to one or more other touch points, thus changing the pattern formed by the touch points. Yet alternatively or additionally, the user-activatable trigger and/or the release mechanism may change the detectable properties of a touch point, e.g. its capacitance, its conductive connection to other touch points, and/or the like.

In some embodiments, the computing device is configured to create a user-perceptible output responsive to detecting the releasable toy element released from said structure. In alternative embodiments, the releasable toy element is connectable to the first toy element such that the releasable toy element is not detectable by the touch screen when connected to the structure and when the first toy element is detectable by the touch screen. For example, the structure may define a detection side configured to face the touch screen for the first toy element to be detectable by the touch screen; and the release mechanism may be configured to engage the releasable toy element such that the releasable toy element is located on a second side different from—e.g. opposite to—the detection side, such that the releasable toy element faces away from the touch screen when the detection side faces the touch screen or is otherwise separated or shielded from the touch screen. In alternative embodiments, the releasable toy element is connectable to the first toy element such that the releasable toy element is detectable by the touch screen when connected to the first toy element and when the first toy element is detectable by the touch screen; and wherein the computing device is configured to detected whether a detected release toy element is connected to or released from the first toy element.

In some embodiments, the release mechanism comprises a sensor for detecting an output from the computing device, and wherein the release mechanism is configured to release the releasable toy element responsive to the sensor detecting an output from the computing device. For example, the release mechanism may comprise an optical sensor configured to detect an optical input generated by the touch screen, e.g. a frequency of a blinking light, or a color of emitted light by the touch screen, etc. Responsive to detecting the first toy element and/or responsive to a game event, the computing device may thus emit a detectible light signal from its touch screen detectable by the optical sensor and configured to cause release of the releasable toy element by the release mechanism.

Generally the term touch screen is intended to comprise touch screens using different detection technologies such as an optical, e.g. laser-based, touch screen, a pressure sensitive screen, or another form of a touch-sensitive and/or touch screen, where proximity or contact of a finger or a pointing device, such as a stylus, is detectable by a computing device comprising, or connected to, the touch screen. The touch screen may be a capacitive touch screen that reacts to a change in surface capacitance. Touching the touch screen can be registered in different ways. Registration may be based on resistive technology which requires less pressure on the surface, but the registration can also be based on capacitive technology, in the form of a change in capacity caused by a contact or even without direct contact with the capacitive screen. The touch can be a physical touch or capacitive touch. Hence, in some embodiments, detecting a toy element in a proximity of a touch screen may require physical contact between the toy element and the touch screen while, in other embodiments, physical contact is not required. The terms "touch point", "touch screen", touch pattern" as used in the present document are intended to cover both situations.

In some embodiments, the toy elements comprise connectors for detachably interconnecting the toy elements so as to create modular spatial toy structures from the toy elements, wherein the toy system comprises at least a first type of toy elements, each of the first type of toy elements being interconnectable with one or more other toy elements and wherein the first type of toy elements are detectable by a touch screen and configured to form, when interconnected with one or more toy elements so as to form a spatial structure, a touch point pattern recognizable by the touch screen. This results in increased variability of interaction between a natural three-dimensional structure and the virtual world. For example, a user may construct a large variety of spatial structures each defining a different pattern of touch points, thus allowing a user to construct a variety of spatial structures that may each be recognized by a processing device having a touch screen.

In an embodiment, the toy system comprises at least a second type of toy elements, wherein the first type of toy elements is configured to be coupled to at least the second type of toy elements, and wherein the second type of toy elements are each configured not to be detected by the touch screen.

In some embodiments, each toy element comprises connectors for detachably interconnecting the toy elements to create spatial structures. Hence, toy elements that have been interconnected with each other by means of the connectors can again be disconnected from each other such that they can be interconnected again with each other or with other toy elements, e.g. so as to form a different spatial structure. In an embodiment, the toy elements are provided with a first and a second type of connectors, such as coupling studs and stud-receiving recesses or other pairs of complementary connectors configured to engage each other so as to form a physical connection. When the connectors are detachably interconnectable, the user may deconstruct previously built spatial structures and re-use the toy elements so as to build new spatial structures. For example, the toy elements may be interconnected/coupled to each other by traction/friction or by an interlocking connection.

In an embodiment, the toy system comprises two or more of the first type of toy elements. Hereby, the variation is further increased.

In an embodiment, each of the toy elements of the first type comprises at least one touch point, which is configured to be detected by the touch screen when engaging or brought into proximity of the touch screen.

In an embodiment, the first and the second type of toy elements are configured to be interconnected such that two or more touch points lie in a common plane of touch points. Hereby, all touch points in the common plane are able to be simultaneously detected by a touch screen.

In an embodiment, each of the one or more touch points is formed as a top surface of a protrusion protruding from an outer surface of the toy element of the first type. The protrusion may be constructionally different in shape and/or size from the connectors, e.g. such that said protrusion cannot be connected to connectors. Hereby, it is possible for the user to easily recognize the difference between touch points and connectors and the associated functions.

In an embodiment, a touch point is defined by the top surface of a protrusion, and the toy elements are configured to be interconnected such that the touch points are the only elements of the spatial structure in said plane of touch points.

In an embodiment, each touch point comprises a smooth surface and rounded outer rim/edges. Hereby, the risk of damaging the touch screen is at least reduced.

In an embodiment, the one or more electrically conductive toy elements are made from a carbon fiber reinforced polymer. In an embodiment, the toy elements are injection molded.

In an embodiment, the at least one or more of the first type of toy element is electrically conductive. In some embodiments, at least a surface area of the construction element that defines the touch point is electrically conductive so as to allow detection by a capacitive touch screen. In an embodiment, the first type of toy elements have a conductive surface area other than the touch point, said conductive surface area is conductively connected to the touch point by a conductive path. Hereby, the user may be able to activate the touch point by touching on the conductive surface area. The conductive area may cover a part or the whole external surface of the toy element. In some embodiments, the second type of toy elements is made from electrically non-conductive material such as plastic.

In an embodiment, the construction elements are configured such that, when two or more toy elements of the first type are interconnected with each other—either directly or via other toy elements, such as toy elements of the second type—they are configured to define a touch point pattern, where said touch point pattern is determined by the dimensions of the toy elements of the toy system.

In an embodiment, the toy elements are configured to be interconnected such that all touch points are positioned on grid points of a regular grid. Hence, when constructing a spatial structure, the touch points will be arranged in a touch point pattern such that their relative positions and distances from each other follow a set of geometrical constraints, thereby reducing the risk of errors in recognizing different patterns. The regular grid may be a two-dimensional grid or a three-dimensional grid, e.g. a square grid, a cubic grid, a rectangular grid or the like.

In an embodiment, the touch point pattern is a variable touch point pattern. For example, the toy elements may be configured to form movable links between coupled toy elements, such as rotatable or sliding elements, enabling the touch points to be movable relative each other, thus creating a variable touch point pattern, e.g. a pattern having touch points with variable relative positions and/or distances from each other while following a set of geometrical constraints. In some embodiments change of the touch pattern may thus be caused by a user-activatable and/or a sensor-activatable trigger and/or by a release mechanism for releasing a releasable toy element, as described herein.

In an embodiment, the toy system may include an input component that can receive signals from a touch screen and generate an effect based on the signals, e.g. light, sound, movement, release of a release mechanism so as to release a releasable toy element, etc. For example one or more of the toy elements, e.g. a toy element of the first type or a toy element of the second type, may comprise a sensor for receiving input from a touch screen, e.g. a light sensitive element.

In an embodiment, the computing device comprises the touch screen, and the computing device comprises a processor configured to recognize a touch point pattern and to generate effects and responses on the touch screen based on a touch point pattern.

Generally, the computing device may comprise a suitably programmed computer such as a portable computer, a tablet computer, a smartphone, a PDA, a game console, a game device, or another programmable computing device, e.g. a device having a touch screen providing a graphical user-interface. In some embodiments, the computing device may include a client system, e.g. including a user interface; and a host system which may create and control a virtual environment or video game. The client and the host system may be connected via a suitable communications network such as the internet.

The computing device may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein.

Here and in the following, the term processor is intended to comprise any circuit and/or device suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The present disclosure relates to different aspects including the toy systems described above and in the following, corresponding apparatus, systems, methods, and/or products, each yielding one or more of the benefits and advantages described in connection with one or more of the above-mentioned aspect, and each having one or more embodiments corresponding to the embodiments described in connection with one or more of the other aspects and/or disclosed in the appended claims.

It will further be appreciated that some embodiments include two or more of the above-described aspects. For example, an embodiment of a toy system according to the first aspect may include one or more toy elements comprising a number of touch points configured to be detectable by a touch screen when brought within a proximity of the touch screen and defining a touch pattern; and a computing device configured to:
  detect said touch pattern of touch points when said one or more toy elements are within a proximity of the touch screen;
  associate a virtual character of a computer game with the detected touch pattern, said virtual character having two or more progression levels within the computer game; wherein the touch pattern is indicative of one of the progression levels and wherein the computing device is further configured to associate one of the progression levels to the virtual character responsive to the detection of the touch pattern.

Alternatively or additionally, an embodiment of a toy system according to the first or according to the second aspect may comprise a first toy element, a releasable toy element releasably connectable to a structure comprising at least the first toy element, and a release mechanism configured to causes release of the releasable toy element from said structure, wherein the releasable toy element is configured to be individually detectable by a touch screen when brought within a proximity of the touch screen; and where the computing device is configured to detect the releasable toy element when the releasable toy element is released from said structure and within a proximity of the touch screen.

BRIEF DESCRIPTION OF THE DRAWINGS

An embodiment of the invention will be described in the following with reference to the drawings wherein:
FIG. 1 is a perspective view of a structure comprising toy elements positioned on a touch screen;
FIGS. 2A-C are a perspective view and two side views of a toy element;

Figure 3:
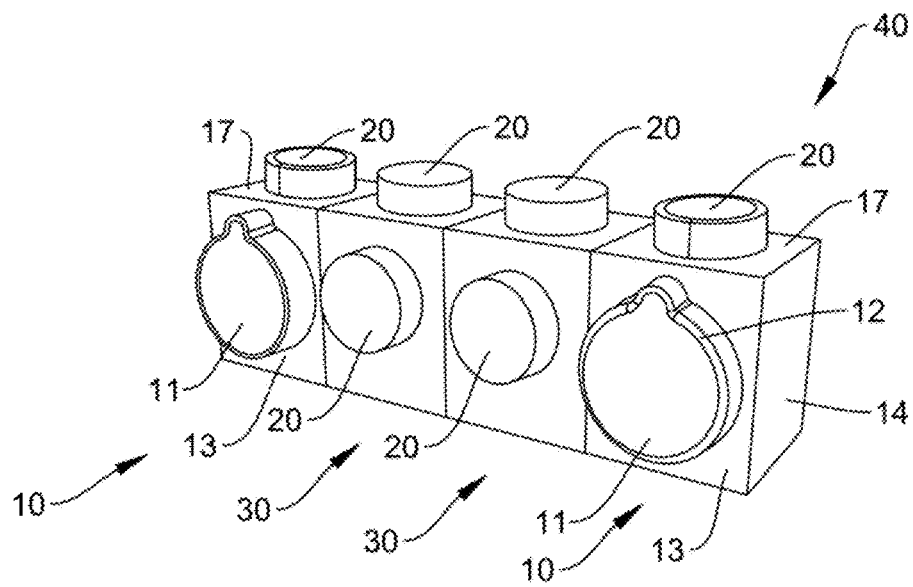
FIG. 3 is a perspective view of a structure comprising toy elements.

DETAILED DESCRIPTION OF EMBODIMENTS OF A TOY SYSTEM WITH REFERENCE TO THE FIGURES

The present invention relates to a toy system and methods for providing interaction between a computing device and toy elements using a touch screen. In some embodiments, the toy system comprises a first type of toy elements, which is configured to be detected by a touch screen, and a second type of toy elements, which is configured not to be detected by the touch screen.

FIG. 1 illustrates a spatial structure, generally designated 40, comprising toy elements, e.g. toy construction model or another structure formed by two or more interconnected toy elements. In the example of FIG. 1, the spatial structure comprises a plurality of toy elements directly or indirectly connected with each other by means of the connectors. The toy elements are interconnectable so as to form a coherent structure.

The structure 40 comprises four toy elements of the first type 10 and one toy element of the second type 30. The first type of toy elements 10 are adapted to be detected by the touch screen 60, and thereby being able to be detected by the touch screen. It will be appreciated, however, that other examples of spatial structures may comprise a different number of construction elements including one, two, or more toy elements of the first type and none, one or more toy elements of the second type.

The first type of toy elements 10 comprises touch points 11 and connectors 20, and the touch points 11 are configured to be registered by the touch screen 60, when the structure is positioned on the touch screen 60 of a computing device 50.

The touch screen is an electronic visual display that the user can control through simple or multi-touch gestures by touching the screen. Touch screens are common in a variety of computing devices such as game consoles, personal computers, tablet computers, and smartphones.

The first type of toy elements 10 that are configured to be registered by a touch screen may be electrically conductive. The toy construction element may be partly or completely made from electrically conductive material so as to provide the capacitive touch on a touch screen, thus being detected by the touch screen. For example, the one or more electrically conductive toy elements may be made of carbon fiber reinforced polymer or from another suitable material. The conductive toy element may be constructed having an inner shell of non-conductive material covered with an outer shell made from a conductive material, or the conductive material may be positioned in bands across the surfaces of the toy elements, thus rendering the surface partly conductive. The first type of toy elements may have a conductive surface area other than the touch point, said conductive surface area being conductively connected to the touch point by a conductive path. In some embodiments, the computing device may be operable to detect a touch point only when the corresponding construction element is touched or otherwise activated by a user, e.g. touched at a predetermined spot or surface area, or when the construction element is conductively connected to another toy element that is touched or otherwise activated by a user.

The computing device 50 comprises a processing unit (such as a CPU) configured to register the spatial structure comprising toy elements having touch point in a pattern positioned on the touch screen and the registered touch pattern generate different corresponding effects.

FIG. 2 illustrates a generally box-shaped toy element of the first type of toy elements. There are three different views 2a, 2b and 2c of the first type of toy elements 10. The perspective view 2a shows the toy element 10 comprising connectors 20 on element surface 17 and a touch point 11 on the element surface 13. The connectors 20 and the touch point 11 are illustrated as protrusions having different shape, in order to recognize the different functions. For example, the connectors 20 may be arranged to frictionally engage corresponding cavities of other toy elements.

The side view 2b shows the connectors 20 on element surface 17, and the touch point 11 on element surface 13. The outer rim 12 of the touch point 11 is rounded. Element surfaces 14, 16, and 18 are flat without protrusions.

The side view 2c shows the touch point 11 with rounded outer rim 12 on element surface 13. The toy element 10 comprises two connectors 20, respectively, on element surface 15 and element surface 17. The two element surfaces 14 and 16 do not have any protrusion. The shown toy element is box-shaped and has three element surfaces each comprising a respective protrusion in the form of a touch point 11 or a connector 20, respectively. In particular, the three element surfaces 13, 15 and 17 each comprise either members for coupling or means for being detected by a touch screen, and three element surfaces 14, 16 and 18 are without additionally functional means.

Generally, in some embodiments, a toy element may define a plurality of faces, e.g. a top face, a bottom face and a number of side faces. In some embodiments a given face may either include one or more touch points or one or more connectors. In some embodiments, a face comprising a touch point does not also include a connector.

FIG. 3 illustrates an oblong spatial structure constructed from four interconnected toy elements 10, 30: two toy elements of the first type 10, and two toy elements of the second type 30. The second type of the toy elements 30 comprises connectors 20, and the first type of toy elements 10 comprise connectors on element surface 17 and a touch point 11 comprising a rounded outer rim 12 is positioned on element surface 13.

The toy elements 10, 30 are provided with a first and a second type of connectors that are configured to be complementary to each other to the effect that they can be detachably interconnected to form a spatial structure 40 comprising interconnected toy elements 10, 30. The two different types of connectors may be in the form of coupling studs and complementary connectors, such as a coupling stud and stud-receiving recesses.

In the example of FIG. 3, the first type of the toy elements 10 are positioned at each end of the oblong structure 40, and the distance between the two toy elements 10 is thus determined by the size of the first and of the second type of toy elements 10, 30.

The protrusions defining the touch point 11 and the connectors 20 are different in shape, such that it is possible to recognize the two different purposes of the toy element 10.

The toy elements can be detachably interconnected by connectors and thereby create a great variety of touch point patterns. The protrusions defining the touch points 11 are higher than the connectors such that they protrude further from the spatial structure than the connectors extending from the same side of the spatial structure. Hence, when the spatial structure faces a touch screen with a side comprising both connectors and protrusions defining touch points, only the touch points contact the touch screen.

The patterns of the touch points are determined by the dimensions of the toy elements. Generally, in some embodiments, the toy elements of a toy construction set may be shaped and sized such that their dimensions and/or the distances between their respective connectors are integer multiples of a unit length. The positions of the touch points may likewise be such that their relative distances from each other in a spatial structure are integer multiples of a unit length, e.g. the same unit length. In particular, the toy elements may be configured such that the positions of the touch points in a spatial structure are positioned on grid points of a regular three-dimensional grid.

The toy system comprising the first type and the second type of toy elements allows the user to create a large set of distinct spatial structures, each identifiable by a corresponding touch point pattern. The user can construct objects with different touch point configurations.

In particular, the large number of individual structures with touch point patterns may be created from a relatively limited set of different toy elements including both the first and second type of toy elements. Combining a small set of toy elements in a toy system dramatically increases the total number of combinatorial possibilities by arranging the conductive bricks in different spatial configurations, and thus also touch point patterns.

In the FIGS. 1 and 3 the spatial structures comprise a plurality of toy elements directly or indirectly connected with each other by means of the connectors of the toy system, e.g. in a predetermined spatial relationship with each other. The touch point patterns are determined by the dimensions of the elements of the toy system.

The toy system is a three dimensional system, wherein the user is able to create spatial structures in three dimensions. The touch points are positioned on grid points of a regular grid. For example at least a subset of the touch points of a spatial structure may be positioned on grid points of a two-dimensional regular grid, e.g. a square grid. A spatial structure may define one or more planes, e.g. parallel planes at regular intervals or otherwise regularly arranged planes, each plane defining a two-dimensional grid.

Figure 4:
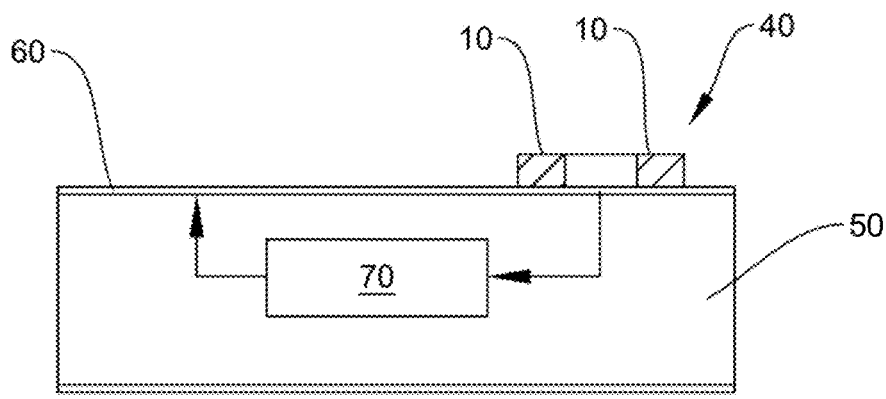
FIG. 4 is a schematic side view of a toy system comprising a toy structure and a computing device.

In FIG. 4 is illustrated a computing device 50 comprising a touch screen 60 and a processor (CPU) 70. The processor 70 is configured to recognize one or more touch point patterns defined by a spatial structure 40, thus allowing the computing device 50 to generate effects and responses on the touch screen 60 based on a touch point pattern provided by toy elements 10 of the toy system. Thus different configurations having different touch point patterns positioned on the touch screen 60 will be registered and generates corresponding effects and or responses. For example, the computing device may have stored thereon a plurality of predetermined touch point patterns, each pattern associated with one or more instructions causing the computing device to perform a respective function associated with the pattern. Examples of such functions may include the creation of visual effects on the touch screen, e.g. in a spatial association with the detected touch point pattern.

Generally, in some embodiments, when each touch point has a geometrical shape that is not rotationally symmetric, the computing device may determine a location and orientation of individual touch points. In any event, the touch screen may recognize the location of one or more of the first type of elements as well as the relative position of the elements, if there are several first type elements on the touch screen. Hence, the computing device may be configured to identify a touch point pattern and to determine the position and/or orientation of the pattern relative to the touch screen. The structure comprising one or more toy elements of the first type can interact with a virtual world and/or other game systems for playing games, and or other user-activated functions. This includes the concurrent use of one or more structures.

The toy system may include an input component that can receive signals from the touch screen and generate an effect based on the signals.

Movable links may be provided between coupled toy elements, such as rotatable or sliding elements, thereby allowing the touch points of a spatial structure to be movable relative to each other. This may enable the touch point pattern to be a variable touch point pattern, wherein the computing device 50 comprises means for recognizing different spatial configurations of the variable touch point patterns and for generating corresponding effects and or responses. In some embodiments, the movement of the touch points of a variable touch point pattern relative to each other may be limited, e.g. such that the touch points may assume a predetermined set of discrete relative positions and/or be moved relative to each other within predetermined boundaries.

The touch points may be of different types. In addition to touch point patterns created by touch points of the toy elements, a touch point pattern may be created by a combination of touch points of the toy elements and other touch points. For example, a touch point pattern comprising three touch points may be created by two touch points of toy elements of the first type in combination with a finger/stylus.

Figure 5:
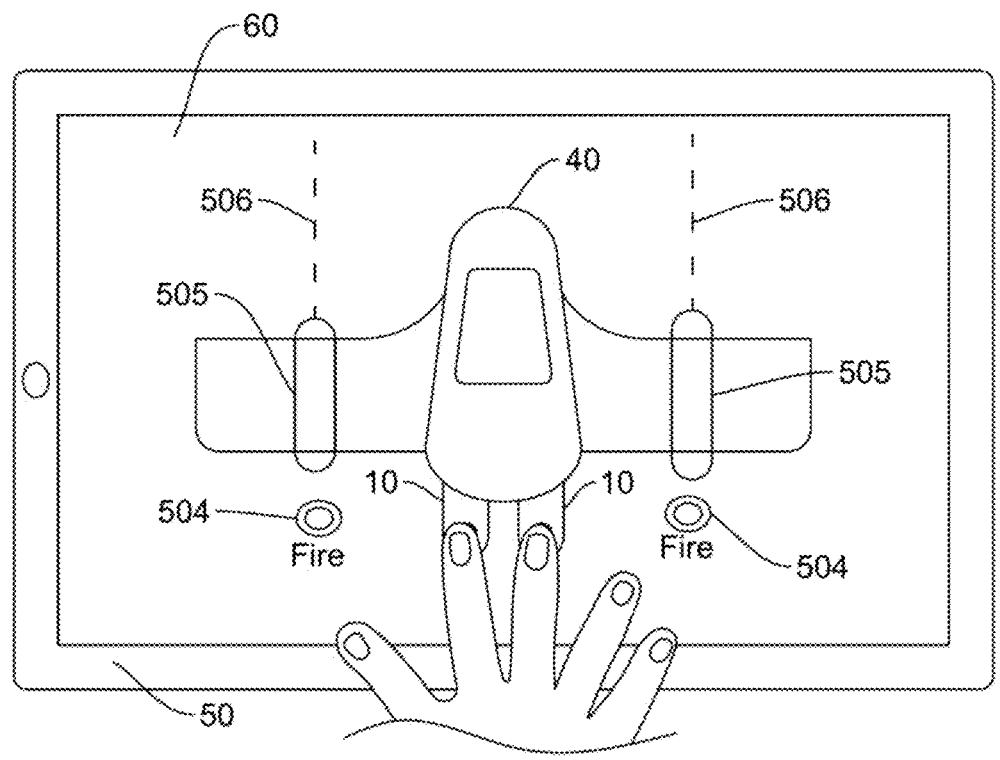
FIGS. 5, 6A-B, 7A-B, 8A-B show examples of a toy system.

FIG. 5 illustrates another embodiment of a toy system comprising a toy 40 and a computing device 50 having a touch screen 60. The toy 40 may be a spatial structure constructed from toy elements as described herein, e.g. including a number of toy elements that each are detectable by the touch screen and which together form a touch pattern which is recognizable by the computing device, e.g. toy elements 10 as described in connection with FIGS. 1-3. The computing device 50 is configured to detect the presence of the toy 40, its position and orientation within the touch screen area. The computing device is further adapted to display user-interface elements 504 on the touch screen in a predetermined spatial relationship relative the detected position of the toy 40. In the example of FIG. 5, the user-interface elements 504 are displayed adjacent the toy and such that the user-interface elements are not obstructed by the toy but visible when the toy is positioned on the touch screen, preferably such that the user can easily associate the displayed user-interface elements with the toy 40. Moreover, the user-interface elements 504 are displayed at positions that are accessible to be touched by the user when the toy 40 is positioned on the touch screen. When the user moves the toy 40 about the touch screen area, the computing device detects such movement and causes the displayed user-interface elements 504 to follow the detected movement, i.e. such that they are displayed in a fixed position relative to the toy. In the example of FIG. 5, the user-interface elements have the form of a virtual button, but it will be appreciated that they may have other forms, e.g. a virtual slider, wheel, or the like. Also, in the example of FIG. 5, the computing device displays two user-interface elements, but it will be appreciated that in other embodiments only a single user-interface element or more than two user-interface elements may be displayed in association with a detected toy 40. The user-interface elements 504 may all have the same appearance, or they may have different appearances, e.g. different shapes, sizes, colors and/or the like.

When the user activates a displayed user-interface element 504, e.g. by a finger touch or another touch event, the computing device detects the touch event in the predetermined spatial relationship with the toy 40 and performs a corresponding function. In particular, when the user touches the touch screen at positions different from the user-interface elements 540, the computing element does not perform the corresponding function, but no or a different function. In the example of the FIG. 5, the toy 40 represents an airplane having guns 505 under its wings. The user-interface elements are displayed behind the guns and activation of the user-interface elements causes the computing device to display projectiles 506 or laser light as if being emitted from the guns of the toy 40. The computing device may further generate sound representing gunfire. It will be appreciated that, in other embodiments, activation of the user-interface elements may trigger other functions, such as the display of other visible effects at screen positions relative to the toy, e.g. display of a protective shield, initiation of engines, ejection of an emergency seat, etc. It will further be appreciated that different user-interface elements may trigger the same effect or different effects, and some effects may require simultaneous activation of multiple user-interface elements 504 or repeated activation of one or more user-interface elements. Also, in some embodiments, the type of function triggered by activation of the user-interface element may depend on other conditions or parameters, e.g. the current game state.

Figure 6:
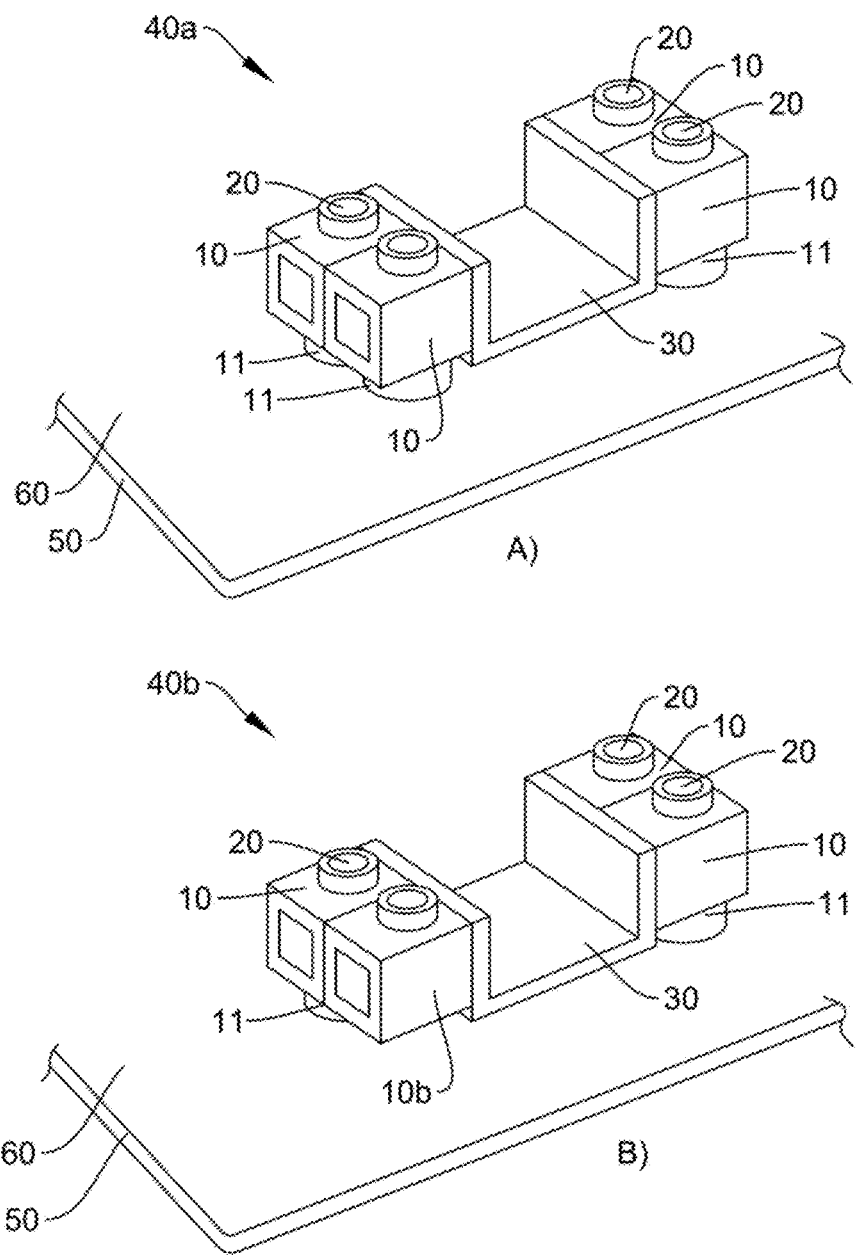

FIG. 6 shows another example of a toy system comprising a toy and a computing device 50 having a touch screen 60. In FIG. 6A, the toy 40a is a spatial structure constructed from toy elements as described herein, e.g. including a number of toy elements that each are detectable by the touch screen and which together form a touch pattern which is recognizable by the computing device. In particular, in the example of FIG. 6, the toy 40a is a spatial structure constructed from elements as described in connection with FIGS. 1-3.

Figure 7:
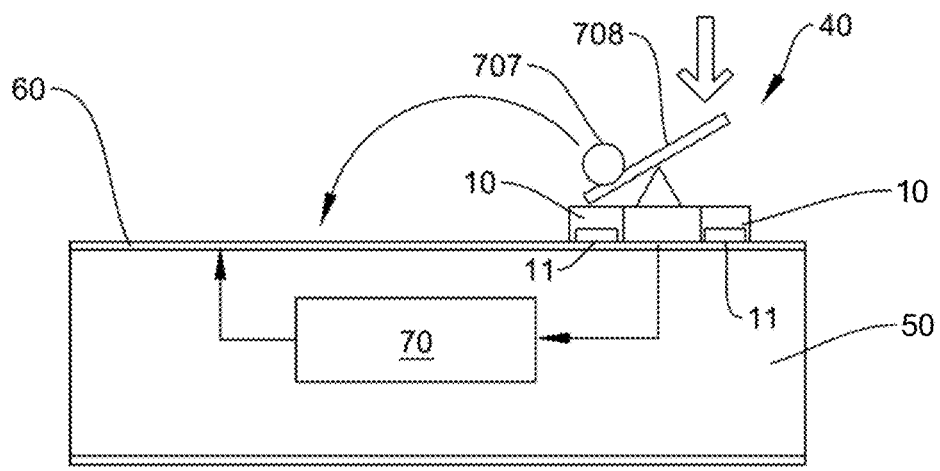
Figure 7:
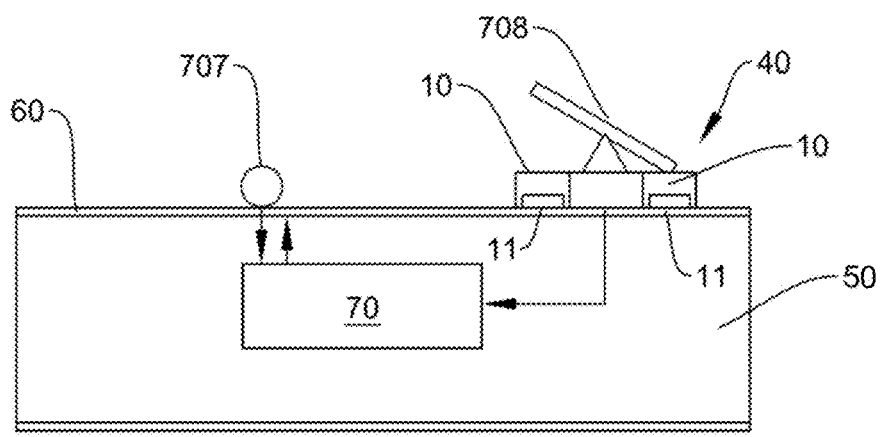

The computing device is configured to detect the touch pattern and thus the presence of the toy 40a, its position and orientation within the touch screen area. Responsive to the detection of the toy 40a, the computing device may perform a play pattern in a video game where the detected toy represents a game character or game object and where the user can influence the game play by moving the toy about the touch screen and/or by activating user-interface elements, e.g. as described in connection with FIG. 5 and/or FIGS. 7-8.

The game involves two or more progression levels of the game character or game object represented by the toy 40a. When the game reaches a certain game state, the game character or game object represented by the toy may thus progress from a first progression level to a second progression level, the second progression level may be associated with a different appearance of the game character or object and/or with different properties, capabilities, and/or the like. The game character or object in the second progression level may thus be represented by a toy having a different appearance, possibly causing the toy to have a different footprint/projection on the touch screen when placed onto the touch screen with a detectable side facing the touch screen. Accordingly, when the second progression level of the game character or object is available to the user, the computing device may inform the user of the availability.

As illustrated in FIG. 6B, the user may then choose to build a toy 40b representing the game character/object at the second progression level. In particular, the toy 40b is a spatial structure constructed from toy elements as described herein, e.g. including a number of toy elements that each are detectable by the touch screen and which together form a touch pattern which is recognizable by the computing device. The toy elements of the toy 40b may be the same as or different from the toy elements from which the toy element 40a was constructed. In any event, the toy elements of the toy 40b are interconnected with each other such that they form a touch pattern different from the touch pattern of the toy 40a so as to allow the computing device to detect the toy 40b and to distinguish it from toy 40b. In particular, in the example of FIG. 6B, the toy 40b differs from the toy 40a in that one of the toy elements 10 defining touch points 11 of toy 40a has been replaced by a toy element 10b which does not define a touch point. Hence, the touch pattern defined by the touch points 11 of toy 40b is different than the touch pattern defined by the touch points 11 of toy 40b. In some embodiments, the computing device displays building instructions instructing the user how to construct the toy 40b corresponding to the game character/object of the second progression level.

As illustrated in FIG. 6B, when the user subsequently positions the newly constructed toy 40b on the touch screen, the computing device is configured to detect the touch pattern of the toy 40b and thus the presence of the toy 40b, its position and orientation within the touch screen area. The computing device further identifies the toy 40b by means of the touch pattern defined by toy 40b as corresponding to the second progression level of the corresponding game character/object. Responsive to the detection of the toy 40b, the computing device may thus perform a play pattern in the video game where the detected toy represents a game character or game object having the second progression level and where the user can influence the game play by moving the toy about the touch screen and/or by activating user-interface elements, e.g. as described in connection with FIG. 5 and or FIGS. 7-8.

Figure 8:
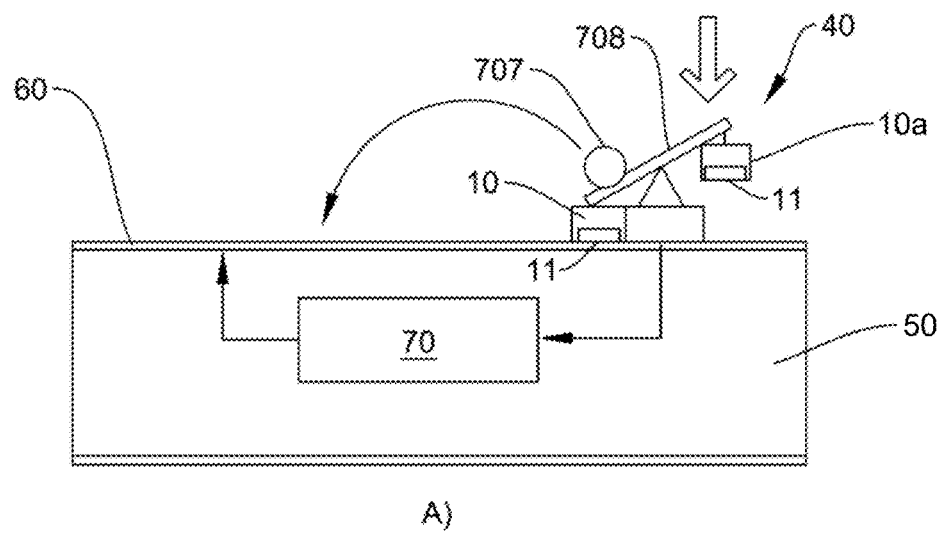
Figure 8:
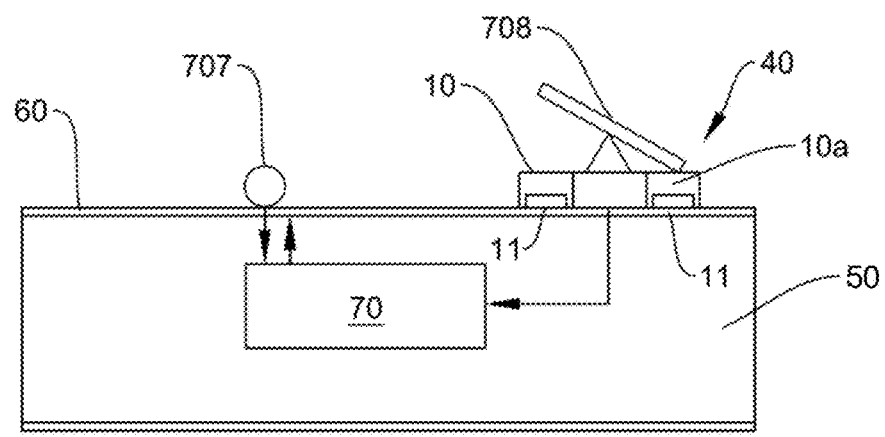

FIG. 8 shows another example of a toy system comprising a toy and a computing device 50 having a touch screen 60. The toy system of FIG. 8 is similar to the system of FIG. 7. However, the first part 40 of the toy of FIG. 8 comprises a toy element 10b operationally coupled to the release mechanism 708 such that its touch point is only brought into contact with the touch screen when the release mechanism is activated. Hence, the computing device can detect whether the release mechanism activated or not. Hence, the computing device can detect whether the additional touch event caused by the releaseable part is actually caused by the release of the part by the first part.

Figure 9:
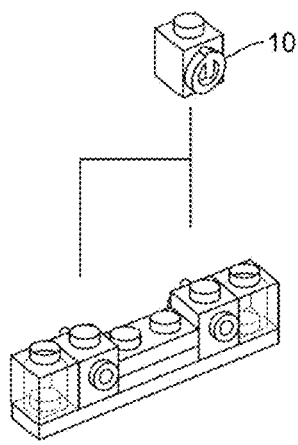
FIGS. 9-10 show examples of building instructions instructing a user how to build a toy model.
Figure 10:
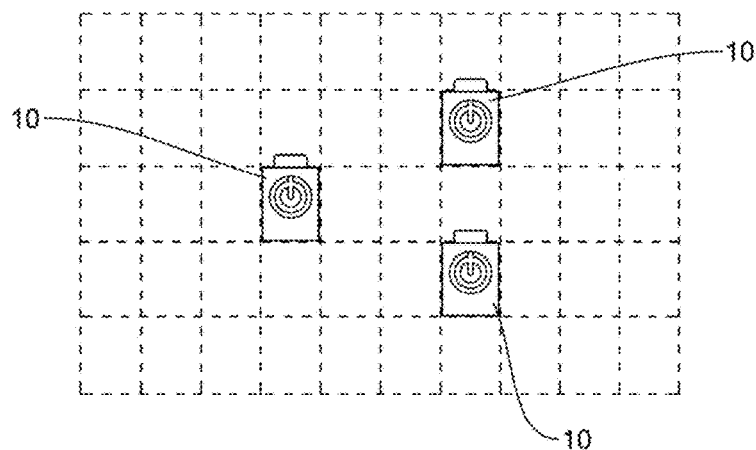

FIGS. 9-10 show examples of building instructions instructing a user how to build a toy model. FIG. 9 shows the building instructions in the form of a pictorial representation of how to assemble a toy corresponding to a game character/object of a certain progression level.

Figure 11:
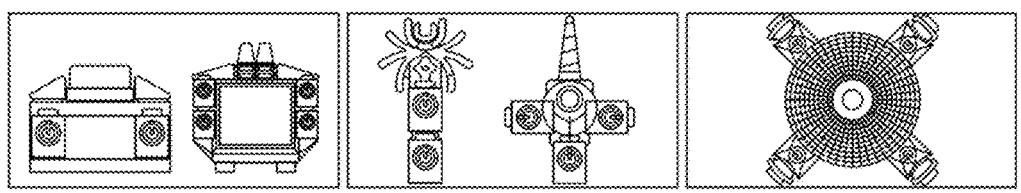
FIG. 11 shows examples of different spatial structures constructed from toy elements.

FIG. 10 merely shows the position of the toy elements that each are detectable by the touch screen and which together form a touch pattern which is recognizable by the computing device. In the example of FIG. 10, the building instructions show which position within a plane the toy elements 10 should have to provide the touch pattern corresponding to a given game character or object. In the example, the toy elements may be positioned on grid points of a 2D regular grid, illustrated by a grid of rectangles in FIG. 10. Hence, in this example, the user may freely select other toy elements so at to connect the toy elements 10 in a suitable fashion such that they create the required touch pattern. FIG. 11 shows examples of different spatial structures constructed from toy elements, including a subset of toy elements that each are detectable by the touch screen and which together form a touch pattern which is recognizable by the computing device and where different touch patterns correspond to different spatial structures.

The invention claimed is:

1. A toy system comprising one or more toy elements configured to be detectable by a touch screen when brought within a proximity of the touch screen, and a computing device configured to detect said one or more toy elements within the proximity of the touch screen;
   wherein the toy system comprises a first toy element, a releasable toy element releasably connectable to a structure comprising at least the first toy element, and a release mechanism configured to cause release of the releasable toy element from said structure, wherein the release mechanism comprises a user-activatable trigger configured to activate the release mechanism;
   wherein the first toy element is configured to be detectable by the touch screen when brought within the proximity of the touch screen;
   wherein the releasable toy element is configured to be individually detectable by the touch screen when brought within the proximity of the touch screen;
   wherein the computing device is configured to detect the releasable toy element when the releasable toy element is released from said structure and within the proximity of the touch screen;
   wherein the releasable toy element is connectable to said structure such that the releasable toy element is detectable by the touch screen when connected to said structure and when the first toy element is detectable by the touch screen; and
   wherein the computing device is configured to detect whether a detected release toy element is connected to or released from said structure.

2. The toy system according to claim 1, wherein the first toy element comprises the release mechanism.

3. The toy system according to claim 1, wherein the computing device is configured to create user-perceptible output responsive to detecting the releasable toy element released from said structure.

4. The toy system according to claim 1, wherein the one or more toy elements comprise connectors for detachably interconnecting one or more the toy elements to create spatial structures, wherein the toy system comprises at least a first type of toy elements, each of the first type of toy element being interconnectable with one or more other toy elements and wherein the first type of toy elements is detectable by the touch screen and configured to form, when interconnected with the one or more toy elements so as to form a spatial structure, a touch point pattern recognizable by the touch screen.

5. The toy system according to claim 4, further comprising at least a second type of toy elements, wherein the first type of toy elements is configured to be coupled to at least the second type of toy elements, and wherein the second type of toy elements is each configured not to be detected by the touch screen.

6. The toy system according to claim 1, wherein the user-activatable trigger and/or the release of the release mechanism is detectable by the computing device.

7. The toy system according to claim 6, wherein the structure comprising the first toy element comprises a number of touch points configured to be detectable by the touch screen when brought within the proximity of the touch screen and defining a touch pattern; and wherein the user-activatable trigger and/or the release mechanism is configured to alter the touch pattern when the user-activatable trigger is activated and/or when the release mechanism releases the releasable toy element.

8. A toy system comprising one or more toy elements configured to be detectable by a touch screen when brought within a proximity of the touch screen, and a computing device configured to detect said one or more toy elements within the proximity of the touch screen;
   wherein the toy system comprises a first toy element, a releasable toy element releasably connectable to a structure comprising at least the first toy element, and a release mechanism configured to cause release of the releasable toy element from said structure, wherein the release mechanism comprises a user-activatable trigger configured to activate the release mechanism;
   wherein the first toy element is configured to be detectable by the touch screen when brought within the proximity of the touch screen;
   wherein the releasable toy element is configured to be individually detectable by the touch screen when brought within the proximity of the touch screen;
   wherein the computing device is configured to detect the releasable toy element when the releasable toy element is released from said structure and within the proximity of the touch screen; and
   wherein the release mechanism comprises a sensor for detecting an output from the computing device, and wherein the release mechanism is configured to release the releasable toy element responsive to the sensor detecting the output from the computing device.

* * * * *